United States Patent [19]

Maeda et al.

[11] Patent Number: 4,691,340

[45] Date of Patent: Sep. 1, 1987

[54] IMAGE INFORMATION ACCESSING USER TERMINAL

[75] Inventors: Satoru Maeda; Akihiko Tao, both of Kanagawa, Japan

[73] Assignee: Sony Corporation, Tokyo, Japan

[21] Appl. No.: 800,822

[22] Filed: Nov. 22, 1985

[30] Foreign Application Priority Data

Nov. 28, 1984 [JP] Japan .................................. 59-251273
Apr. 20, 1985 [JP] Japan .................................... 60-85237

[51] Int. Cl.$^4$ ............................................ H04M 11/08
[52] U.S. Cl. ........................................ 379/96; 379/98; 379/102
[58] Field of Search ........................ 179/2 DP, 2 TV; 364/200; 379/96, 97, 98, 93, 102

[56] References Cited

U.S. PATENT DOCUMENTS

| 4,012,594 | 3/1977 | Paller ................. | 179/2 DP |
| 4,084,231 | 4/1978 | Capozzi et al. ........ | 364/200 |
| 4,150,254 | 4/1979 | Schussler et al. ...... | 179/2 TV |
| 4,161,728 | 7/1979 | Insam .................. | 340/750 |
| 4,289,930 | 9/1981 | Connolly et al. ....... | 179/2 TV |
| 4,387,271 | 6/1983 | Artom .................. | 179/2 DP |
| 4,451,701 | 5/1984 | Bendig ................. | 179/2 TV |
| 4,578,535 | 3/1986 | Simmons ................ | 179/2 DP |
| 4,581,484 | 4/1986 | Bendig ................. | 179/2 DP |

OTHER PUBLICATIONS

Fedida, "View Data", May 1977, Wireless World, pp. 55–59.

Sharpless et al, "An Advanced Home Terminal For Interactive Data Communication", Jun. 1977.

Primary Examiner—Gene Z. Rubinson
Assistant Examiner—Matthew E. Connors
Attorney, Agent, or Firm—Lewis H. Eslinger; Alvin Sinderbrand

[57] ABSTRACT

A user terminal for use in a Videotex system includes an image number memory for storing image number data identifying specific ones of the images. A keyboard is provided for entering at least an image selection command, and the user terminal is responsive thereto to display the image whose image number data is stored in the image number memory. The image number memory automatically stores the image number data of the image currently displayed, or the image number memory may be made to store the image number data of at least one selected image in response to a reserve and register command.

8 Claims, 8 Drawing Figures

IMAGE INFORMATION ACCESSING USER TERMINAL

BACKGROUND OF THE INVENTION

1. Field of the Invention

This invention relates generally to Videotex systems and more particularly is directed to a user terminal for use in such Videotex systems.

2. Description of the Prior Art

A Videotex system is a system for transmitting information, in the form of pages of text and color graphics, over the telephone lines from an information center providing electronic information services to a user terminal at which the information may be viewed page by page on a display screen. The system can provide users with information from many different sources, such as banks, newspapers, businesses and private information networks.

In Videotex systems, the information is organized into successive pages of information, each page corresponding to one complete image on the display screen. Each page is identified within the system by a number or other identifier which is displayed on the screen simultaneously with the information. The user terminal conventionally includes a display apparatus, such as a CRT having the display screen on which the successive images are displayed, and a keypad including a plurality of keys for controlling the user terminal and for entering data. In order to access information from the information center, the user inputs commands at the user terminal by operating the keypad and image data corresponding to requested pages is transmitted from the information center over the telephone line to the user terminal. Some commands request specific subject matter or pages, and frequently instructions for entering other commands will be included in the received information itself.

When the telephone link between the user terminal and the information center is disconnected, either intentionally or accidentally, the user must redial to reestablish the telephone link. However, redialing initializes the Videotex system, so that the user is returned to the initial page of information rather than to the page which was being viewed at the time of disconnection. If the user could remember the number of the page last viewed, that page number could be entered directly to resume use without significant interruption. There are, however, hundreds of thousands of pages available, making it very unlikely that the user will remember the correct number. As a result the user must step through the pages of information, duplicating the previous search, in order to rediscover the desired page. This process is time consuming and vexatious, and represents a significant disadvantage in the use of Videotex systems.

OBJECTS AND SUMMARY OF THE INVENTION

Accordingly, it is an object of the present invention to provide a user terminal for a Videotex system which removes the above-described disadvantages of the prior art.

More specifically, it is an object of this invention to provide a user terminal for communicating with an information center over a communications network in order to receive image data transmitted therefrom, and in which a selected image may be easily recalled by providing for the storage of a respective identifying number.

It is another object of this invention to provide a user terminal, as aforesaid, wherein the image being viewed at the time of disconnection of a telephone line or other communications network may be easily recalled upon reconnection of the telephone line.

It is a further object of this invention to provide a user terminal, as aforesaid, in which the image number of a currently displayed image is automatically stored, so that this image may be readily recalled by actuation of a unitary key for causing the stored number to be transmitted to the information center as a request for the respective image.

It is still a further object of the present invention to provide a user terminal of, as aforesaid, in which the numbers of several selected images may be stored in respective addresses in a memory, and wherein a selected one of these images may be recalled by accessing the respective address within the memory.

In accordance with an aspect of the present invention, a user terminal for displaying one of a plurality of images transmitted in the form of respective image data and image number data from an information center over a communications network in response to commands therefor entered at the user terminal comprises network terminal means adapted to be connected to the communications network for receiving the image data and image number data therefrom and for supplying the commands thereto, display control means including image memory means for storing received image data and for generating a video signal in response to the stored image data, display means for displaying an image corresponding to the video signal, image number memory means for storing image number data corresponding to at least one of the images, and manually actuable input key means for entering one of the commands by which an image selection is effected, the user terminal being responsive to the image selection to display an image whose image number data is stored in the image number memory means.

In one embodiment of the present invention, the image number memory means stores only the image number data of the image currently being displayed, and the input keying means includes unitary autorequest key means actuable for entering the image selection command. In this embodiment, if the telephone line is disconnected and reconnected, the image being viewed at the time of disconnection can be immediately recalled by actuation of the autorequest key means.

In a second embodiment of the invention, the image number memory means is adapted to store the image number data for a selected plurality of the images, and the input keying means is actuable for selectively entering a corresponding plurality of image selection commands each selecting a respective one of the plurality of images. In this embodiment, the input keying means is actuable for effecting a reserve and register operation in which the image number data of the image currently being displayed is stored in the image number memory means. Any one of the images whose image number data is stored may be recalled at any time by actuation of the input keying means to access the respective image number data from the memory.

The above, and other objects, features and advantages of the present invention, will be apparent from the following detailed description of illustrative embodi-

DESCRIPTION OF THE PREFERRED EMBODIMENTS

Figure 1:
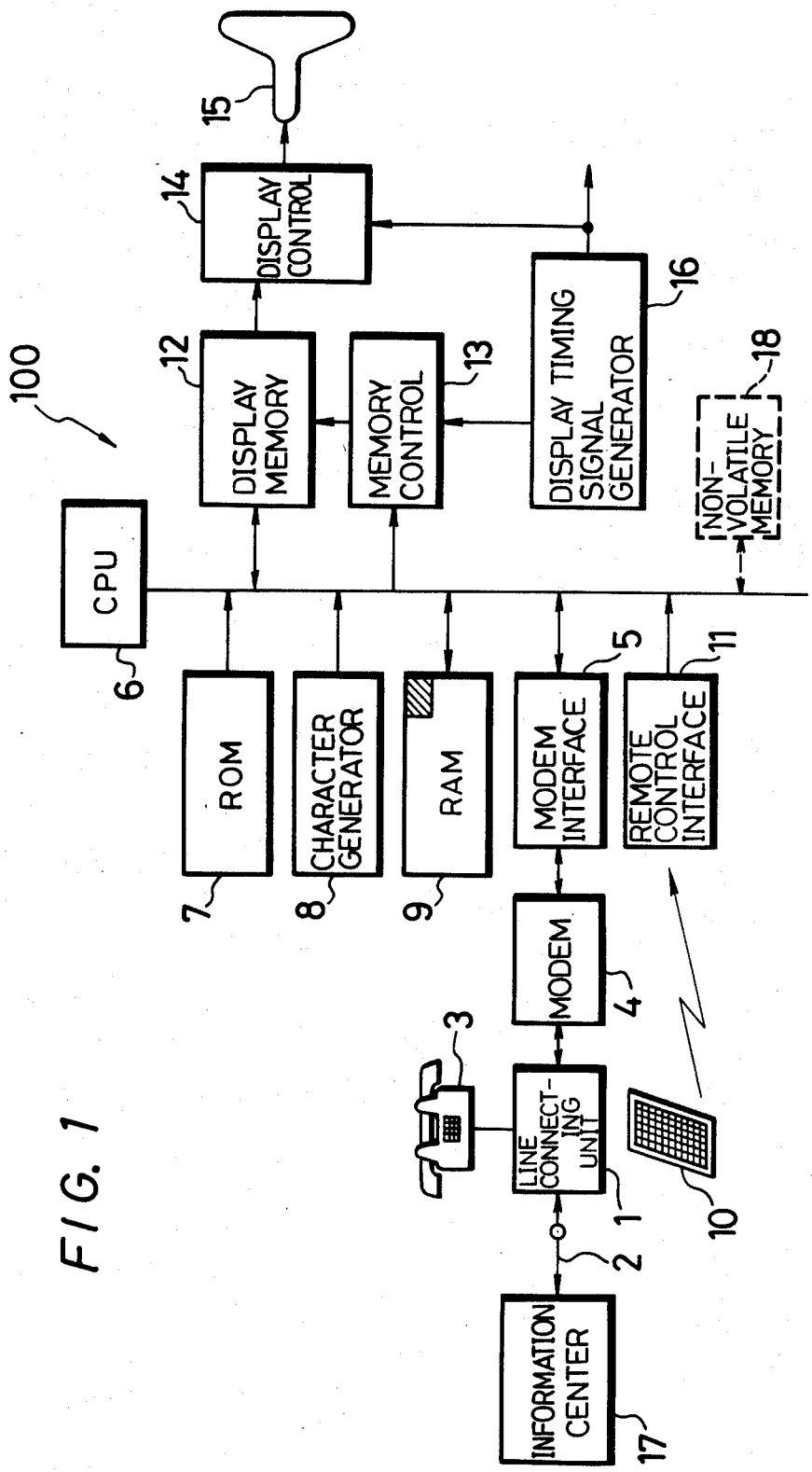
FIG. 1 is a block diagram of a user terminal in accordance with an embodiment of the present invention.

Referring to the drawings in detail, and initially to FIG. 1 thereof, it will be seen that the three fundamental elements of a Videotex system are a user terminal 100, an information center 17 and a telephone network line 2 connecting the two and over which data and commands are transmitted. In the following discussion, the user terminal 100 according to the present invention will be described as operating in the environment of the CAPTAIN Videotex system developed in Japan. There are a number of Videotex systems presently operating around the world, such as NAPLPS (North American Presentation-Level-Protocol Syntax), available in the United States, the Telidon system available in Canada, and the Prestel system available in Great Britain. Other systems available in the United States are The Source and Compuserve information services. It will be appreciated that the user terminal according to the present invention could operate advantageously in any of these environments, and the present invention is not limited to use in the CAPTAIN system.

The CAPTAIN system, like other Videotex systems, is an interactive system. The user enters requests for information, the requests are processed at information center 17, and the appropriate image is transmitted to user terminal 100. The information center 17 itself is not necessarily at a single location, but may be composed of a number of different computing centers each having data bases of hundreds of thousands of pages of information. These different centers are connected to one another over telephone network lines and may further be connected to external computer systems which provide services such as online bookings, financial quotations or banking services. Information center 17 may also be adapted to provide system messages to user terminal 100. In short, information center 17 is a highly complex information source, and is expected to grow even more complex with advances in technology and data communications interface systems. However, information center 17 does not comprise part of the present invention except insofar as it is responsive to received commands, as defined below, and to transmit image data corresponding to selected images to user terminal 100 in response to such commands. This general operation of an information center 17 is well known.

A line connecting unit 1 operates as a switch to selectively connect telephone network line 2 to either a conventional telephone 3 or to a modem 4. Modem 4 is conventionally used for demodulating telephone signals received from telephone network line 2 and supplying the demodulated signals in recognizable form to a modem interface 5 of user terminal 100. Modem 4 is further operative for modulating signals supplied from modem interface 5 into telephone signals and for supplying the same to telephone network 2. Modem 4 may be physically separate from user terminal 100 or it may be incorporated therein to form a single structure therewith. The circuitry and structure of modem 4 and modem interface 5 are conventional.

User terminal 100 further includes a central processing unit (CPU) 6 for controlling the signal processing and internal operations of user terminal 100, a program read only memory (ROM) 7 for storing the operating programs utilized by CPU 6, a character generator 8 and a random access memory (RAM) 9, which is used as a work area for CPU 6.

Figure 1A:
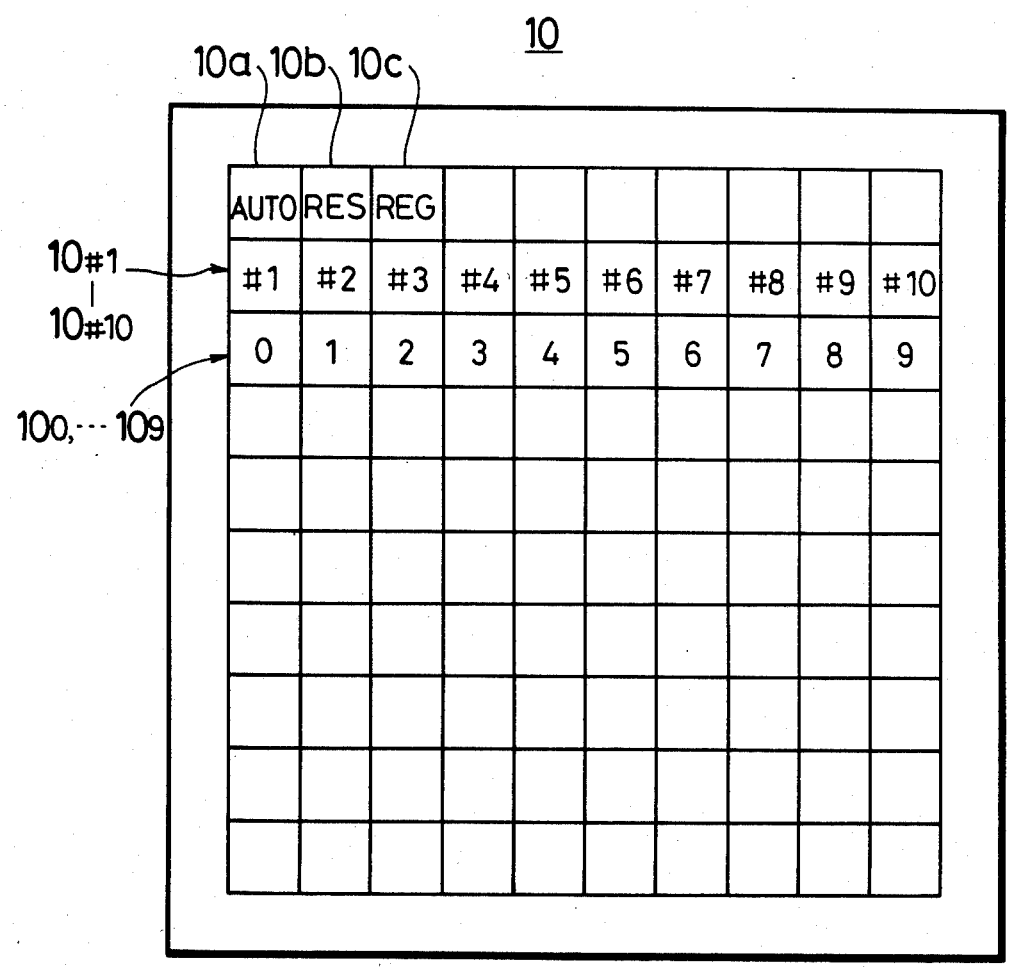
FIG. 1A is a diagram of a keypad of the user terminal of FIG. 1.

A keypad 10 is provided with a plurality of keys actuable for entering various commands into user terminal 100. As discussed below, and as shown on FIG. 1A, these keys may include an autorequest key 10a, and numerical keys $10_0$, $10_1$ . . . $10_9$ for entering numerical data as part of a command. In the illustrated embodiment, keypad 10 is provided as a remote control unit, and user terminal 100 includes a remote control interface 11 conventionally adapted to receive infrared frequency signals generated by keypad 10 and for translating the same into corresponding input data acceptable by CPU 6. However, it will be appreciated that keypad 10 could be provided within the main structure of user terminal 100 as an integrated portion thereof.

A display memory 12 stores data received through modem interface 5. In the CAPTAIN system, the received data includes blocks of image data, each block corresponding to one image or page of information, and respective header data identifying the information. The header data describes the nature of the particular image data and might include an identification of the particular information retrieval system being accessed, the priority or security level of the data, and similar information. Importantly, the header data will include an identification recognizable by information center 17 as identifying this particular image data. In the present description, this identifying information is designated the image number data corresponding to the image data. In the CAPTAIN system, this image number data is, in fact, a nine digit number. In other systems, the identifying information may take another form, but as long as it identifies the particular image data, it may be considered equivalent to the image number data as described herein. Further, in the CAPTAIN system, identification data is provided which allows CPU 6 to determine whether the received data is image data or header data. However, there is no identification data provided within the header data itself to distinguish between the various elements of the header data, such as, the title of the image, a message associated with the image, and in particular the image number data. However, the header data is provided in a predetermined format in which the image number data always occurs at a certain position within the header data specifically from the 20th character to the 28th character. It is also possible to determine when the characters in these positions are alphabetic, rather than numeric, in which case the characters are not image number data.

On occasion, a message within the header data may occupy these character positions, and so image number data is not available. Such messages usually include letters rather than numbers, and letters can be distinguished from numbers by pattern recognition methods. Consequently, CPU 6 will be able to distinguish the cases when the image number is available and when it is not. By such means, CPU 6 is able to detect the image member data within the header data.

A memory control circuit 13 controls display memory 12. The blocks of image data corresponding to one page of information and respective header data stored in display memory 12 are read out therefrom by a display control 14, which processes the image data and generates a video signal corresponding to the image data. The video signal is then supplied to a display tube 15, which may be a conventional CRT. A display timing signal generating circuit 16 connected to both memory control 13 and display control 14 generates control signals used in the display of the images, including synchronizing signals and display position signals, in accordance with known display techniques.

The operation of user terminal 100 in accessing an image will now be described. Initially, user terminal 100 is linked through modem interface 5, modem 4, line connecting unit 1 and telephone network line 2 to information center 17. To begin the image accession operation, the user actuates selected keys on keypad 10 to input a command accessing one of the available images. Conventionally, this command may be to display the next image following the image currently being displayed, or it may be the selection of a particular image, in which case the command will include the image number of the particular image to be displayed. In accordance with the present invention, the command may be an image selection command which accesses the image whose image number data is stored in an image number memory such as numeric register 9a of RAM 9.

The entered command is transmitted, conventionally over infrared frequencies, to remote control interface 11, wherein it is translated into computer input data and supplied to CPU 6. CPU 6 modifies the input data to put it into a predetermined format acceptable by information center 17. CPU 6 supplies the modified input data through modem interface 5 to modem 4, which modulates the data and transmits it as a telephone signal through line connecting unit 1, over telephone network line 2 and to information center 17. At information center 17, the received command signal is processed and the requested data is transmitted back to user terminal 100 over telephone network line 2 through line connecting unit 1, modem 4 and modem interface 5. The data transmitted from information center 17 includes the block of image data corresponding to the selected image and the respective header data, and is temporarily stored in work RAM 9.

CPU 6 now determines whether the image data received is character code data. If it is character code data, CPU 6 reads out corresponding font data from character generator 8 and stores the same in display memory 12 together with appropriate color data. If the image data is not character data, it is written directly into display memory 12.

Figure 2:
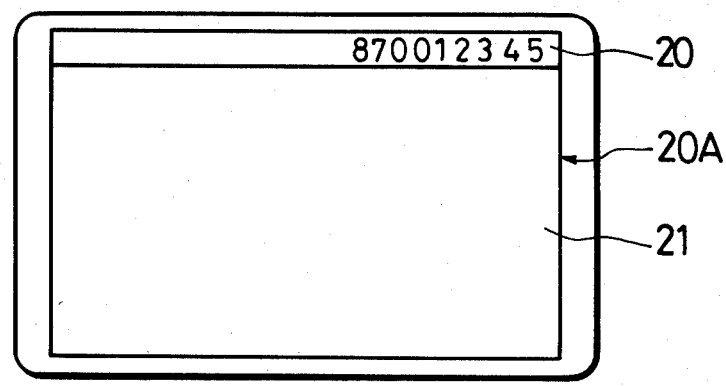
FIG. 2 is a diagram showing an example of a display screen available in a Videotex system.

The display corresponding to the image data and the header data is illustrated in FIG. 2, which illustrates a display screen 20A presenting an image or page in the CAPTAIN system. Display screen 20A is divided into a header portion 20 and an image portion 21. Image portion 21 displays the image data while header portion 20 contains such information as a message from the information center 17, the title of the image, or the image number. Thus, from this header data, the user may note the image number of the image the user is currently viewing. Subsequently, the user can immediately recall the desired image by inputting the image number previously noted from header portion 20 of display screen 20A. However, given the fact that hundreds of thousands of pages are available over Videotex and that the image number in the CAPTAIN system has nine digits, the user would have to remember nine digits even to recall one page, while to recall one of several pages would require an even greater feat of memorization. Furthermore, disconnection may occur accidentally at any time, due to the failure of transmission of the carrier from the information center for any reason, or if the user fails to input a command within a predetermined time and thus activates an automatic shut-off condition. To constantly keep track of the image numbers just in case the system may go down is excessively inconvenient. This problem is eliminated by the user terminal according to the present invention.

In accordance with an important aspect of the invention, there is provided an image number memory for storing the image number data of at least one selected image, and which, in the illustrated embodiment, includes numeric register 9a of work RAM 9. The image number data can be actively reserved in a reserve and register operation executed in response to actuation of keys on keypad 10, or the image number data of the image data currently stored in image memory 12 may be automatically stored in numeric register 9a upon the receipt of the data. In a preferred embodiment, numeric register 9a stores the image number data of a single image, and a single actuation of unitary auto-request key 10a (FIG. 1A) on keypad 10 causes display of the image whose image number data is stored in the image number memory constituted by numeric register 9a.

Figure 3:
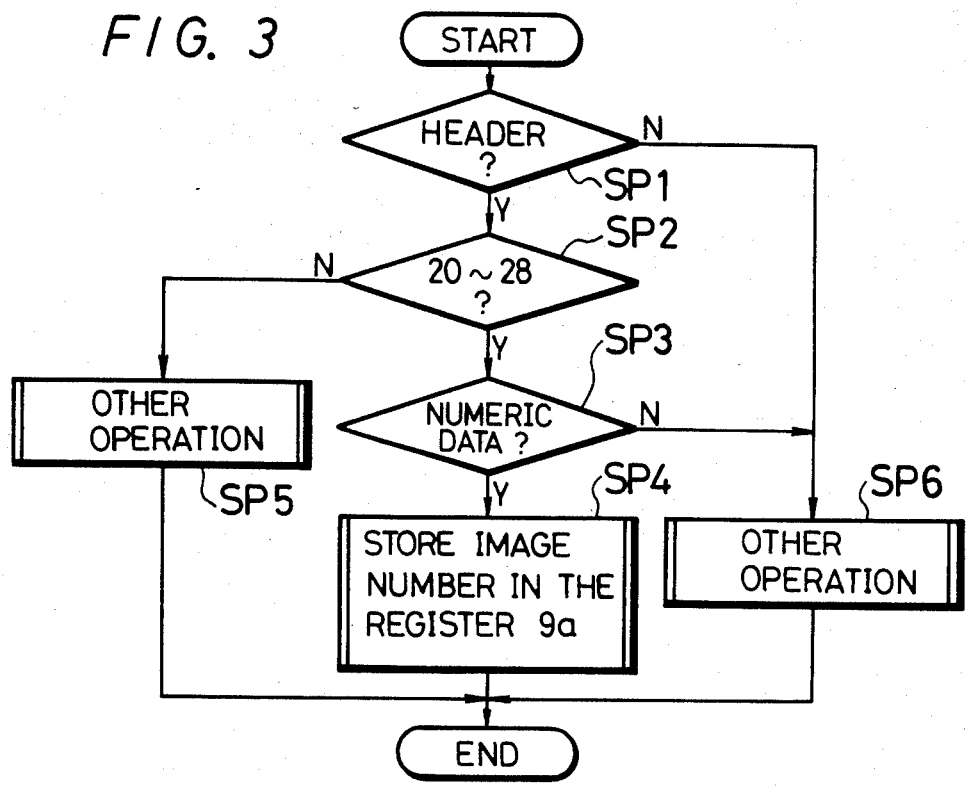
FIG. 3 is a flowchart of an operating program for storing image number data in accordance with the present invention.

The operation of user terminal 100 in detecting image number data in the header data and writing the same in numeric register 9a will now be discussed in connection with the flowchart of FIG. 3 which illustrates an operating program for CPU 6 normally stored in ROM 7 and loaded into CPU 6 for operation. The program begins when the incoming data is received, and in step SP1, CPU 6 judges whether the received data is header data or image data. If in step SP1 it is determined that the data being considered is image data, CPU 6 proceeds to step SP6, to perform another operation in accordance with the overall operating program of CPU 6. If it is determined in step SP1 that the received data is header data, the program proceeds to step SP2, wherein CPU 6 determines whether the data being considered lies within the range of position allocated for image number data, that is from the 20th character to the 28th character. If in step SP2, CPU 6 determines that the data is outside the correct range for image number data, the program proceeds to step SP5 to perform another operation in accordance with the overall operating program of CPU 6. If the data considered in step SP2 is within the range from the 20th to the 28th character, then CPU 6 judges in step SP3 whether or not this data is numeric or alphabetic. If in step SP3 CPU 6 determines that the data is alphabetic data, CPU 6 proceeds to step SP6 for further operations. As mentioned above, the definition of alphabetic information implies that this data represents a message from information center 17 rather than image number data. In the CAPTAIN system, the data may be encoded in a number of different ways which are assigned ranks within the system. If the data being judged in step SP3 has been transmitted with a rank higher than 2, the received coded information can be determined to be numeric or alphabetic data from the codes themselves. On the other hand, if the data transmission is of rank 1, then the incoming data are determined to be numeric or alphabetic by using pattern recognition techniques utilizing numeric patterns previously stored. In either case, CPU 6 will be able to detect the image number data in the header data if it is present, or will be able to detect its absence.

If the incoming data are determined to be numeric data, it is assumed that this data is the image number data, and the program proceeds to step SP4, wherein the image number data is written digit-by-digit in numeric register 9a. This operation is automatically performed each time a new block of image data is received, and so updated image number data is constantly being written into numeric register 9a. Since user terminal 100 itself keeps track of the image number of the currently displayed image, the user no longer needs to do so.

In the embodiment being presently described, the image number of only the currently displayed image is stored in the image number memory constituted by numeric register 91. Consequently, if the telephone link with information center 17 is disconnected, user terminal 100 continues to store the image number of the image which was being viewed at the time of disconnection. As a result, a single unitary autorequest key 10a is sufficient to recall this image.

Figure 4:
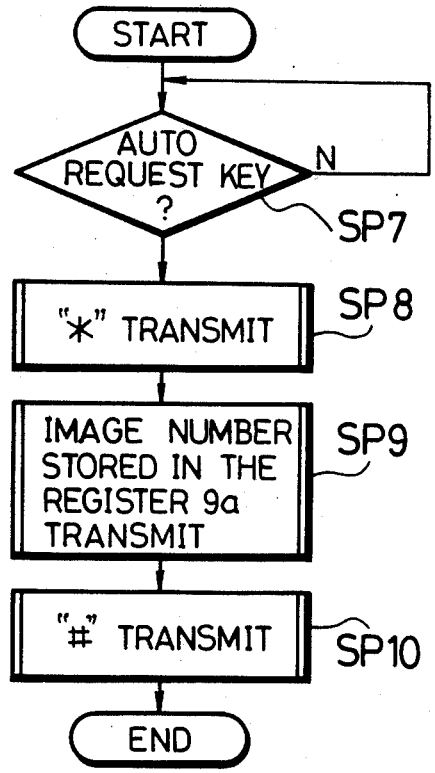
FIG. 4 is a flowchart of an operating program for automatically transmitting image number data to an information center in accordance with the present invention.

The operation of user terminal 100 in response to actuation of the autorequest key 10a is performed in accordance with the flowchart illustrated in FIG. 4. In step SP7, CPU 6 determines whether autorequest key 10a has been depressed. If it has, CPU 6 proceeds to step SP8, wherein it transmits a code "*", then proceeds to step SP9 in which it reads the image number data stored in numeric register 9a and transmits the same to information center 17, and then proceeds to step SP10, wherein it transmits a code "#". Thus, the data received at information center will appear as "*(image number data)#", which is a predetermined format acceptable under the CAPTAIN system. Information center 17 is responsive to this command to transmit the block of image data and respective header data identified by the received image number data. Thus, in this embodiment, actuation of autorequest key 10a by itself effects an image selection without the user being required to remember or enter the image number data himself. If the user wishes to redisplay the image present when the line was disconnected, he can access this image immediately simply by actuating autorequest key 10a. In a practical sense, the operation of user terminal 100 greatly simplifies the use of the Videotex system and provides a significant advantage.

As described above, the image number memory may be provided as numeric register 9a within work RAM 9. Alternatively, a non-volatile memory 18, illustrated in broken lines in FIG. 1, may be provided as the image number memory. In this case, even when the power of user terminal 100 is turned off, the image number data is retained in non-volatile memory 18. When non-volatile memory 18 is provided as the image number memory, CPU 6 may be programmed to automatically transmit the image number stored in memory 18 to information center 17 whenever the power is turned on and the telephone link established, without requiring any key operation at all. In such case, the system is initialized to the image whose number is stored in memory 18, rather than to the first numbered image.

In the above-described embodiments of the user terminal according to the present invention, the image number data of a single image is stored in the image number memory. In another embodiment of the user terminal according to the present invention, image number data corresponding to a selected plurality of images may be stored in the image number memory, and a corresponding plurality of image selection commands may be entered on keyboard 10 for selectively retrieving respective images.

Figure 5:
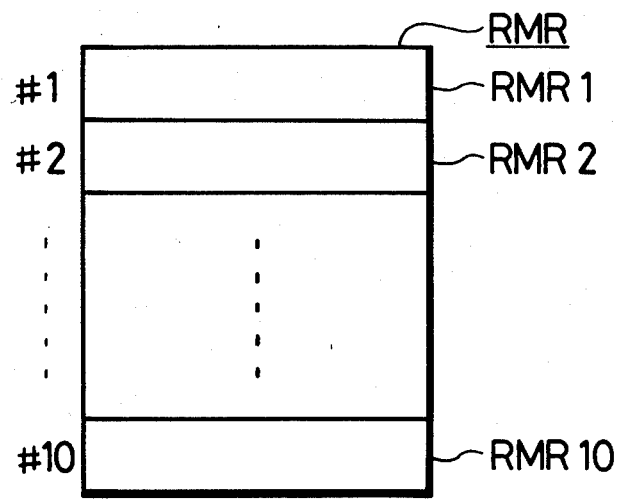
FIG. 5 is a diagram illustrating the organization of an image number memory of a user terminal according to another embodiment of the invention.

In such other embodiment, both numeric register 9a and non-volatile memory 18 are used as the image number memory. Memory 18 is now provided with, for example, 10 ordered memory locations or reserve number registers RMR1, RMR2, ... RMR10 organized as a reserve number memory RMR, as illustrated in FIG. 5. These 10 ordered memory locations are respectively assigned addresses indicative of the order of the memory locations. Thus, reserve number register RMR1 is assigned address "#1", RMR2 is assigned address "#2", etc. The addresses serve as identifiers of the particular memory locations in which the image number memory is to be recorded and are easy to remember in that they are much shorter than the nine digit image number data. These addresses are thus curtailed numbers which may identify selected images. Keyboard 10 includes correspondingly numbered register keys $10_{\#1}, 10_{\#2}$–$10_{\#10}$ for entering the curtailed numbers.

CPU 6 operates as in the first discussed embodiment to detect the image number data in the header data currently stored in image memory 12 and automatically stores the image number data in numeric register 9a whenever a new block of data and header data are received. CPU 6 can transfer this image number data to an identified one of registers RMR1 to RMR10 of reserve number memory RMR upon command.

Figure 6:
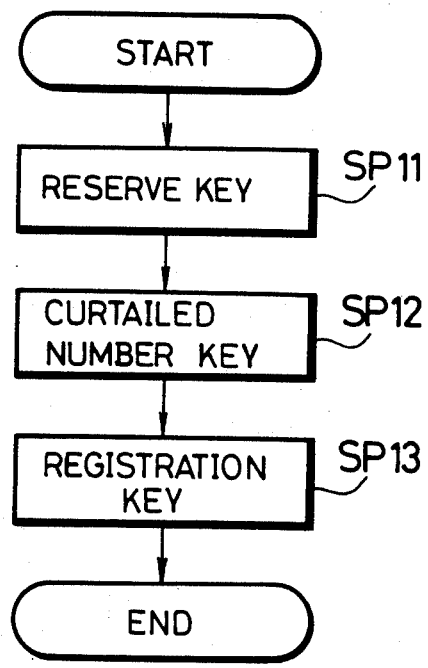
FIG. 6 is a flowchart of key operation for a reserve and register operation.

Thus, at any particular time when user terminal 100 is in use, a particular block of image data and its respective header data are stored in image memory 12, and the corresponding image and header information are displayed on picture screen 20A. At this time, the user may decide he wants to refer to this particular image in the future, and consequently wishes to store the image number data of this image. This is achieved by a reserve and register operation performed by CPU 6. The sequence of steps performed by the user in the reserve and register operation is illustrated in FIG. 6. The operation begins at SP11 by actuation of a reserve key 10b on keypad 10 to initiate the reserve operation. The user then actuates a selected one of register keys $10_{\#1}$–$10_{\#10}$ in step SP10 to enter the address of the memory location or register RMR1–RMR10 in which the image number data currently stored in numeric register 9a is to be stored. The curtailed number #1–10, corresponding to the address or location in memory RMR at which respective image number data is stored is short and easy to remember. The user then actuates a registration key 10c in step SP13 to cause CPU 6 to store the image number data in the identified memory location.

Figure 7:
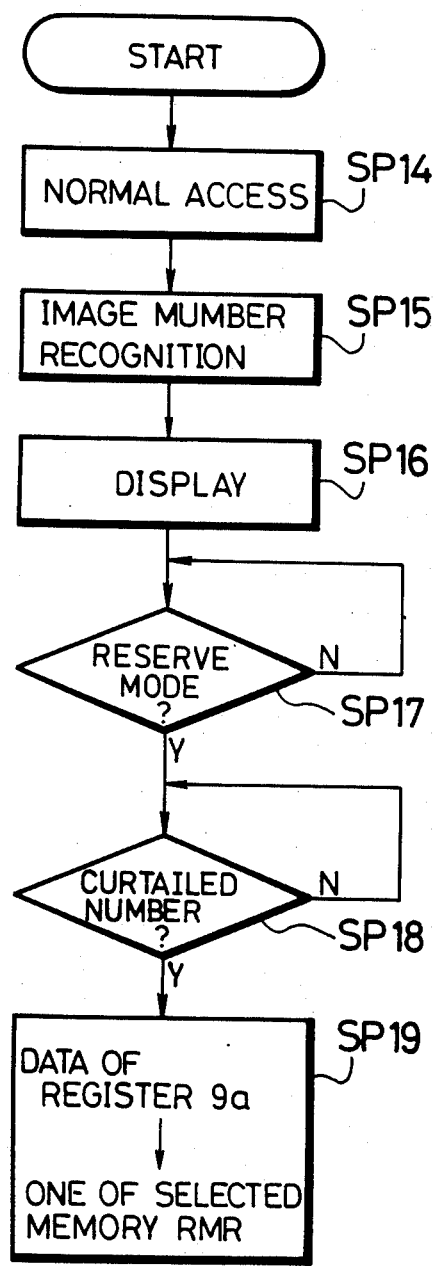
FIG. 7 is a flowchart of an operating program for the reserve and register operation of FIG. 6.

The operation of CPU 6 in response to actuation of selected keys of keypad 10 is in accordance with the flowchart illustrated in FIG. 7. The program of FIG. 7 begins at step SP14, in which a new image is accessed in one of the conventional accessing procedures. In the illustrated example, a particular image is selected by entering the full image number data through actuation of the numeric keys $10_1$–$10_{10}$ on keypad 10. CPU 6 is responsive to this entered image number data to add code "*" to the beginning and code "#" to the end of the entered image number data and to transmit this modified data in its predetermined format to information center 17. Accordingly, as described above, the corresponding image data and header data is transmitted from information center to user terminal 100, in which the received data, including image data and header data, is initially stored in work RAM 9. Then, in step SP15, CPU 6 extracts, from the header data, the image number data lying in the allocated region from the 20th character to the 28th character and stores the detected image number data in numeric register 9a of work RAM 9, as before. Thereafter, CPU 6 proceeds to step SP16, in which it transfers the image data from work RAM 9 to display memory 12, so that the corresponding image is thereby displayed on display tube 15, at the same time as the header data is also displayed. However, the image number data remains in numeric register 9a.

If now the user actuates the reserve key 10b, as indicated in FIG. 6, CPU 6 is responsive thereto to store the image number data from numeric register 9a into an identified register of reserve number register or memory RMR. Specifically, if the user actuates the reserve key in step SP11 of FIG. 6, CPU detects this in step SP17 of FIG. 7 and enters the reserve mode. Of course, if reserve key 10b is not depressed, CPU 6 is placed in the standby mode or performs other, unrelated, operations.

When reserve key 10b is depressed in step SP11 and this is detected in SP17, CPU 6 moves to step SP18, wherein it judges whether a register key entering a curtailed number identifying a selected one of the memory registers or memory RMR has been depressed.

When CPU 6 determines that a curtailed number has been entered, it proceeds to step SP19, wherein the image number data of register 9a is transferred to the selected memory register RMR1–RMR10 whose address corresponds to the curtailed number. Thus, the user may select any image to be reserved by storing the respective image number data. Each of reserve memory registers RMR1–RMR10 may be written into any number of times, with each writing erasing the previously stored image number data.

When the user wishes to recall a selected one of the reserved images, it is only necessary to actuate the register key $10_{\#1}$–$10_{\#10}$ indicative of the curtailed number of the register or memory RMR in which the respective image number data is stored. Consequently, all the user need remember is a number from 1 to 10 identifying the register in which the selected image is associated, and only a single key has to be actuated in order to recall the image. This is clearly far more convenient than having to remember and input a nine digit number. Actuation of one register key will cause CPU 6 to read the image number data from the correspondingly numbered register RMR1–RMR10, attach a code "*" to the beginning of the image number data and a code "#" to the end thereof, and to transmit the same to information center 17. Again, information center 17 is responsive to this command to supply the image data an respective header data identified by the received image number data. This not only makes the operation easier, but also reduces the possibility of misoperation.

Since, according to the present invention, the image number data is detected in the data supplied from information center 17 and is stored in a register RMR1-RMR10 by actuation of a single register key, and is recalled by actuation of the same register key, it is never necessary for the user to input the image number data which he wishes to be stored. Consequently, the operation of user terminal 100 is correspondingly simplified.

Although specific embodiments of the invention have been described in detail herein with reference to the accompanying drawings, it is to be understood that the invention is not limited to those embodiments, and that various changes and modifications can be effected therein by one skilled in the art without departing from the scope or spirit of the invention as defined in the appended claims.

We claim:

1. A user terminal for displaying one of a plurality of images transmitted in the form of respective image data and image number data from an information center over a communications network in response to commands therefor entered at said user terminal, said user terminal comprising:

network terminal means adapted to be connected to said communications network for receiving said image data and image number data therefrom and for supplying said commands thereto;

display control means including image memory means for storing received image data and for generating a video signal in response to said stored image data, said image memory means initially storing the image number data corresponding to the current image data;

display means for displaying an image corresponding to said video signal;

image number memory means for storing the image number data corresponding only to the current image data stored in said image memory means;

said display control means including means for detecting the image number data initially stored in said image memory means and means for automatically storing the detected image number data in said image number memory means; and manually actuable input keying means including unitary autorequest key means actuable for entering an image selection command by single actuation thereof by which image selection is effected, said user terminal being responsive to said image selection to display an image whose image number data is stored in said image number memory means.

2. A user terminal according to claim 1, wherein said image number memory means includes RAM numeric register means.

3. A user terminal according to claim 1, wherein said image number memory means includes non-volatile memory means for storing said image number data.

4. A user terminal according to claim 3, wherein said user terminal is responsive to power turn-on to display the image whose image number data is stored in said non-volatile memory means.

5. A user terminal for displaying one of a plurality of images transmitted in the form of respective image data and image number data from an information center over a communications network in response to commands therefor entered at said user terminal, said user terminal comprising:

network terminal means adapted to be connected to said communications network for receiving said image data and image number data therefrom and for supplying said commands thereto;

display control means including image memory means for storing received image data and for generating a video signal in response to said stored image data;

display means for displaying an image corresponding to said video signal;

image number memory means for storing image number data corresponding to n of said images and including n ordered memory locations; and manually actuable input keying means for entering one of said commands by which an image selection is effected, said user terminal being responsive to said image selection to display one of said n images whose image number data is stored in said image number memory means, said input keying means being actuable for effecting a reserve and register operation, and said display control means including means responsive to said reserve and register operation for detecting the image number data currently stored in said stored image memory means and for storing said detected image number data in said image number memory means;

said input keying means including reserve key means including n reserve keys actuable for entering corresponding numbered identifiers indentifying numbers 1, 2, ... n, each identifier identifying the correspondingly numbered memory location;

said reserve and register operation including entry of one of said identifiers to identify the memory location in which the detected image number data is to be stored; and said command for effecting image selection is constituted by entry of the identifier which identifies the one memory location in which the image number data of the respective image data has been stored by single actuation of the respective reserve key, said user terminal being responsive to said image selection to display the image whose image number of data is stored in the identified one memory location of said image number memory means.

6. A user terminal for communicating with an information center over a communications network to receive image data transmitted from said information center to said user terminal in response to command data transmitted from said user terminal to said information center, said image data including a plurality of image data blocks and respective header data associated therewith, and said header data including image number data identifying the respective image data block; said user terminal comprising:

network terminal means adapted to be connected to said communications network for receiving said image data blocks and respective header data therefrom and for supplying said command data thereto;

display control means including image memory means for storing a received image data block and respective header data, said display control means generating a video signal in response to the image data block stored in said image memory means;

display means for displaying an image corresponding to said video signal;

image number memory means for storing only the image number data corresponding to the current image data block stored in said image memory means said display control means including means for detecting the image number data in the header data stored in said image memory means and means for automatically storing the detected image number data in said image number memory means;

manually actuable input keying means including unitary autorequest key means actuable for entering an image selection command by single actuation thereof for selecting the image data block whose image number data is stored in said image number memory means;

and command data generating means responsive to said image selection command for generating selection command data including the image number data of the selected image data block and for supplying said selection command data to said network terminal means.

7. A user terminal for communicating with an information center over a communications network to receive image data transmitted from said information center to said user terminal in response to command data transmitted from said user terminal to said information center, said image data including a plurality of image data blocks and respective header data associated therewith, and said header data including image number data identifying the respective image data block; said user terminal comprising:

network terminal means adapted to be connected to said communications network for receiving said image data blocks and respective header data therefrom and for supplying said command data thereto;

display control means including image memory means for storing a received image data block and respective header data, said display control means generating a video signal in response to the image data block stored in said image memory means;

display means for displaying an image corresponding to said video signal;

image number memory means for storing the image number data corresponding to a selected plurality of said image data blocks and including a plurality of identifiable memory locations;

manually actuable input keying means for selectively entering a plurality of commands including a corresponding plurality of an image selection commands each selecting a respective image data block whose image number data is stored in a respective one of said identifiable memory locations in said image number memory means; said input keying means being further actuable for entering a reserve and registration command, said display control means including means responsive to said reserve and registration command for detecting the image number data from the header data currently stored in said image memory means and for storing said detected image number data in said image number memory means;

said input keying means further including reserve key means actuable for entering a plurality of identifier commands each identifying a respective one of said memory locations, wherein entry of said reserve number command includes entry of one of said identifier commands to identify the memory location in which the detected image number data is to be stored; and command data generating means responsive to said image selection command for generating selection command data including the image number data of the selected image data block and for supplying said selection command data to said network terminal means;

entry of said one image selection command including entry of the identifier command which identifies the one memory location in which the image number data of the respective image data block has been stored, and said command data generating means responsive to said image selection command generates said selection command data to include the image number data stored at said one memory location.

8. A user terminal according to claim 7, wherein said image number memory means includes n ordered memory locations and said reserve key means includes n keys actuable for entering corresponding numbered identifier commands each identifying the correspondingly numbered memory location.

* * * * *